(12) United States Patent
Shigeno

(10) Patent No.: US 9,645,170 B2
(45) Date of Patent: May 9, 2017

(54) SCANNING PROBE MICROSCOPE

(71) Applicant: HITACHI HIGH-TECH SCIENCE CORPORATION, Minato-ku, Tokyo (JP)

(72) Inventor: Masatsugu Shigeno, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 14/671,775

(22) Filed: Mar. 27, 2015

(65) Prior Publication Data
US 2015/0276797 A1    Oct. 1, 2015

(30) Foreign Application Priority Data

Mar. 27, 2014 (JP) ................. 2014-066363

(51) Int. Cl.
*G01Q 70/12* (2010.01)
*G01Q 70/02* (2010.01)
*G01Q 70/10* (2010.01)

(52) U.S. Cl.
CPC ............ *G01Q 70/02* (2013.01); *G01Q 70/10* (2013.01)

(58) Field of Classification Search
CPC ........ G01Q 70/00; G01Q 70/02; G01Q 70/06; G01Q 70/08; G01Q 70/10; G01Q 70/12
USPC ... 850/1, 2, 3, 4, 5, 6, 7, 33, 34, 35, 36, 37, 850/38, 39, 40, 41, 42, 52, 55, 56, 57, 58, 850/59, 60, 61, 62
See application file for complete search history.

(56) References Cited

U.S. PATENT DOCUMENTS

| 6,435,015 B1 | 8/2002 | Yamamoto | |
| 2003/0151267 A1* | 8/2003 | Yamanaka | ................ B82B 3/00 294/99.1 |

FOREIGN PATENT DOCUMENTS

JP    2006-250954 A    9/2006

* cited by examiner

*Primary Examiner* — Nicole Ippolito
(74) *Attorney, Agent, or Firm* — Brinks Gilson & Lione

(57) ABSTRACT

A scanning probe microscope includes a cantilever that has a first attachment surface and a cantilever attachment portion that has a second attachment surface to which the first attachment surface of the cantilever is attached. Columnar elements including nanofibers or nanotubes are formed on the second attachment surface, and the second attachment surface adheres to the first attachment surface by using the columnar element.

9 Claims, 3 Drawing Sheets

SCANNING PROBE MICROSCOPE

RELATED APPLICATIONS

This application is based upon and claims the benefit of priority of Japanese Patent Application No. 2014-066363 filed on Mar. 27, 2014, the contents of which are incorporated herein by reference in its entirety.

BACKGROUND OF THE INVENTION

Field of the Invention

The present invention relates to a scanning probe microscope.

A scanning probe microscope measures a surface shape and various properties of a sample by moving or bringing a probe attached to a distal end of a cantilever close to or into contact with a sample surface.

The cantilever in the scanning probe microscope is manufactured by means of a semiconductor manufacturing process, and has dimensions such as a thickness of 0.3 mm to 0.5 mm, a width of 1.3 mm to 1.6 mm, and a length of approximately 3 mm. With regard to the scanning probe microscope which is commercially available now, in many cases, the scanning probe microscope adopts a configuration in which an intermediate component, a so-called lever holder, is disposed for convenience of handling, and the cantilever and the lever holder are temporarily attached to each other so as to be mounted on a probe microscope main body. However, the presence of the intermediate component such as the lever holder disadvantageously affects automation, and thus a structure thereof becomes complicated. Consequently, not only is rigidity weakened, but also device performance is degraded.

For this reason, a method also exists in which the cantilever is directly attached to a cantilever attachment portion in a distal end of a fine adjustment mechanism without using the lever holder. In this case, a vacuum suction method is adopted in order to fix the cantilever from the viewpoint of miniaturization and automation (refer to JP-A-2006-250954).

However, if the vacuum suction method is employed in order to fix the cantilever, it is necessary to provide a vacuum suction mechanism or pump. Consequently, it is difficult to achieve miniaturization or cost reduction of the overall scanning probe microscope.

There is a type of scanning probe microscope which performs measurement through scanning of a cantilever attachment portion to which a cantilever is fixed (so-called lever scanning method). In this case, if the vacuum suction mechanism is disposed in the cantilever attachment portion, the cantilever attachment portion becomes heavier, thereby causing a problem in that a response to movement of the cantilever attachment portion is delayed, the movement of the cantilever attachment portion is impeded by a vacuum tube, or unnecessary resonance is generated due to vibrations of the vacuum pump.

In a case where the cantilever is fixed to the cantilever attachment portion by using a magnet, there is a possibility of magnetic influence on the scanning probe microscope when being applied to a magnetic force microscope (MFM).

SUMMARY OF THE INVENTION

The present invention is made in view of the above-described problems, and an object thereof is to provide a scanning probe microscope which can realize weight reduction and has no magnetic influence without requiring a complicated mechanism when a cantilever is fixed to a cantilever attachment portion.

In order to achieve the above-described object, a scanning probe microscope according to the present invention includes a cantilever that has a first attachment surface, and a cantilever attachment portion that has a second attachment surface to which the first attachment surface of the cantilever is attached. Columnar elements including a nanofibers or a nanotubes are formed on the second attachment surface, and the second attachment surface adheres to the first attachment surface by using the columnar elements.

According to this scanning probe microscope, it is unnecessary to provide a complicated mechanism such as a vacuum suction mechanism when the cantilever is fixed to the cantilever attachment portion. It is possible to realize miniaturization, weight reduction, and cost reduction of the overall scanning probe microscope. In addition, the cantilever attachment portion does not become heavier, and a response to movement of the cantilever attachment portion is improved. In addition, unlike a case where the cantilever is fixed to the cantilever attachment portion by using a magnet, it is possible to avoid magnetic influence during measurement.

Furthermore, there is an advantage in that a commercially available cantilever can be used without any change.

A scanning probe microscope according to the present invention includes a cantilever that has a first attachment surface, and a cantilever attachment portion that has a second attachment surface to which the first attachment surface of the cantilever is attached. Columnar elements including a nanofiber or a nanotube are formed on the first attachment surface, and the first attachment surface adheres to the second attachment surface by using the columnar elements.

According to this scanning probe microscope, it is also unnecessary to provide a complicated mechanism such as a vacuum suction mechanism when the cantilever is fixed to the cantilever attachment portion. It is possible to realize miniaturization, weight reduction, and cost reduction of the overall scanning probe microscope. In addition, the cantilever attachment portion does not become heavier, and a response to movement of the cantilever attachment portion is improved. In addition, unlike a case where the cantilever is fixed to the cantilever attachment portion by using a magnet, it is possible to avoid magnetic influence during measurement.

A scanning probe microscope according to the present invention includes a cantilever that has a first attachment surface, and a cantilever attachment portion that has a second attachment surface to which the first attachment surface of the cantilever is attached. Columnar elements including a nanofiber or a nanotube are formed on both the first attachment surface and the second attachment surface, and the second attachment surface and the first attachment surface adhere to each other by using the columnar elements.

According to this scanning probe microscope, it is also unnecessary to provide a complicated mechanism such as a vacuum suction mechanism when the cantilever is fixed to the cantilever attachment portion. It is possible to realize miniaturization, weight reduction, and cost reduction of the overall scanning probe microscope. In addition, the cantilever attachment portion does not become heavier, and a response to movement of the cantilever attachment portion is improved. In addition, unlike a case where the cantilever is fixed to the cantilever attachment portion by using a magnet, it is possible to avoid magnetic influence during measurement.

The columnar elements are formed on both the first attachment surface and the second attachment surface. Accordingly, a suction force generated by the columnar elements increases, and it is easy to maintain a suction state when each attachment surface is dirty.

The scanning probe microscope may further include a cantilever supply mechanism that holds the cantilever for replacement. The cantilever supply mechanism may have an installation surface for installing the cantilever and a wall portion protruding from the installation surface. A configuration may be adopted in which the cantilever after use can be detached from the cantilever attachment portion by moving the cantilever attachment portion so that the cantilever comes into contact with the wall portion after the cantilever is installed on the installation surface which is unoccupied in the cantilever supply mechanism.

According to the scanning probe microscope, the wall portion applies force in a horizontal direction (direction parallel to an adhesion surface) to a portion between the cantilever and the cantilever attachment portion. The adhesion force of the columnar elements is weakened rapidly. Therefore, it is unnecessary to dispose a complicated mechanism for detaching the cantilever in the cantilever supply mechanism, thereby enabling the cantilever to be easily detached. The detached cantilever can be held by the cantilever supply mechanism without any change.

The installation surface may have an elastic body.

According to this scanning probe microscope, when the cantilever is attached to a lower surface of the cantilever attachment portion, even if an error occurs in an attachment angle between an upper surface and the lower surface or an error occurs in an optimum pressing distance during the attachment due to variations in the thickness of the cantilever attachment portion, it is possible to absorb the variations by pressing harder. As the elastic body, a rubber sheet, a gel sheet, or a plate having a spring mechanism may be employed.

According to the present invention, it is possible to provide a scanning probe microscope which can realize weight reduction and has no magnetic influence without requiring a complicated mechanism when a cantilever is fixed to a cantilever attachment portion.

DETAILED DESCRIPTION OF THE PREFERRED EMBODIMENTS

Hereinafter, an embodiment of the present invention will be described with reference to the drawings.

Figure 1:
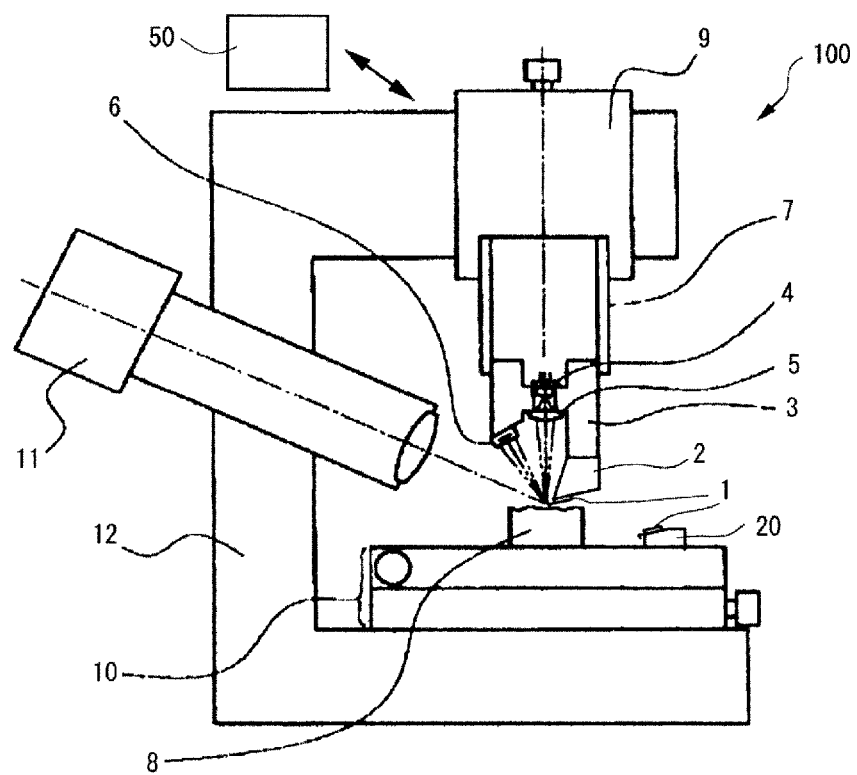
FIG. 1 is a block diagram of a scanning probe microscope according to an embodiment of the present invention.

FIG. 1 is a block diagram of a scanning probe microscope 100 according to the embodiment of the present invention. In FIG. 1, the scanning probe microscope 100 includes a cantilever 1, a cantilever attachment portion 2, a fine adjustment mechanism 7, a Z-stage 9, an XY-stage 10, a frame 12 for supporting each configuration component of the scanning probe microscope 100, a cantilever supply mechanism 20, and a control unit (computer) 50 for controlling the overall scanning probe microscope 100. The cantilever supply mechanism 20 holds multiple cantilevers 1 for replacement, and is arranged in one corner of the XY-stage 10.

In the scanning probe microscope 100, a displacement detection system and the cantilever attachment portion 2 are integrated to each other, thereby configuring an optical head 3. The displacement detection system is configured to include a semiconductor laser 4, a lens 5, and an optical detection element 6. The cantilever attachment portion 2 is arranged in a distal end of the optical head 3. The cantilever 1 is attached by adhering to the cantilever attachment portion 2 as will be described later. A probe 1$t$ (refer to FIG. 2) is attached to a distal end of the cantilever 1.

A sample 8 is placed on the XY-stage 10. The optical head 3 is attached to a distal end of the fine adjustment mechanism 7. The fine adjustment mechanism 7 controls a position of the cantilever 1 in a height (Z) direction, and causes the cantilever 1 to scan the sample 8 in a direction inside a sample surface (XY). The fine adjustment mechanism 7 is attached to the Z-stage 9, and the Z-stage 9 delivers the cantilever 1 to a position of coming into contact with the sample 8. An optical microscope 11 is disposed in order to observe a surface state of the sample 8 and to align the cantilever 1 with the sample 8. Then, it is possible to measure any desired portion of the sample 8 by operating the XY-stage 10 while a positional relationship between the cantilever 1 and the sample 8 is observed by using the optical microscope 11.

The scanning probe microscope 100 according to the present embodiment is a scanning probe microscope which employs a lever scanning method of performing measurement through scanning of the cantilever attachment portion 2.

In this way, the probe of the cantilever 1 is moved to or brought into contact with the sample 8. At this time, laser light emitted from the semiconductor laser 4 is condensed on a rear surface of the distal end of the cantilever 1 by the lens 5. The optical detection element 6 is irradiated with the reflection light. In this manner, force acting between the probe and the sample 8 is measured as displacement of the cantilever 1 to which the probe is attached. The surface of the sample 8 is scanned while a displacement amount of the cantilever 1 is held constant by the fine adjustment mechanism 7. That is, an optical lever method is employed in which positional deviation of the reflection light of the light with which the cantilever 1 is irradiated is detected as the displacement of the cantilever 1.

In this case, physical properties of the surface of the sample 8 are measured by using a control signal for maintaining the constant displacement amount of the cantilever 1 as physical property information.

The XY-stage 10 is a coarse adjustment mechanism for positioning the cantilever 1 at any desired position inside the surface of the sample 8. The Z-stage 9 is a coarse adjustment mechanism for moving the cantilever 1 close to the sample 8 in the height (Z) direction.

The fine adjustment mechanism 7 controls the cantilever 1 to maintain a constant distance from the sample 8, and causes the cantilever 1 to scan the surface of the sample 8. For example, the fine adjustment mechanism 7 is configured to include a piezoelectric element having three axes.

Figure 2:
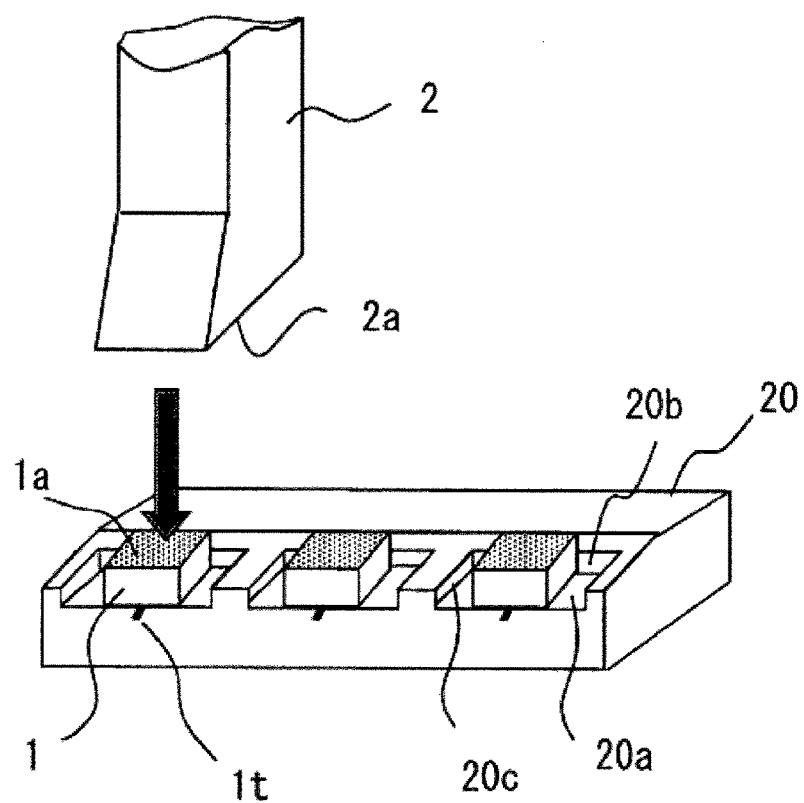
FIG. 2 is a perspective view of a cantilever supply mechanism.

Next, the cantilever attachment portion 2 according to an aspect of the present invention will be described with reference to FIG. 2. The cantilever attachment portion 2 is configured so that a lower surface 2$a$ thereof has a tilting block shape and columnar elements including nanofibers or nanotubes are formed on the lower surface 2a. Then, an upper surface 1a of the cantilever 1 is attached by adhering to the lower surface 2a of the cantilever attachment portion 2. In this case, there is an advantage in that a commercially available cantilever can be used without any change.

The upper surface 1a of the cantilever 1 corresponds to a "first attachment surface" disclosed in the scope of claims, and the lower surface 2a of the cantilever attachment portion 2 corresponds to a "second attachment surface" disclosed in the scope of claims.

The columnar elements including the nanofibers or the nanotubes have a nano-sized diameter, and thus it is understood that the columnar elements follow an irregular surface of an adherent and an adhesion force is applied by the Van der Waals' force. In particular, columnar elements including a carbon nanofiber or a carbon nanotube are disclosed in JP-A-2011-132387 and Japanese Patent No. 5374354. According to Japanese Patent No. 5374354, the adhesion force of the above-described columnar elements is 5 N/cm$^2$ or more, a surface area of the cantilever 1 is approximately 0.03 cm$^2$ to 0.10 cm$^2$, and the mass of the cantilever is approximately 0.03 g to 0.01 g. Accordingly, the cantilever 1 is sufficiently fixed by adhering to the cantilever attachment portion 2.

The above-described multiple columnar elements extend from the lower surface 2a of the cantilever attachment portion 2 in a substantially vertical direction.

The columnar elements including the nanofiber or the nanotube may be a single layer or a multiple layer. In addition, a diameter, a specific surface area, and density of the columnar elements can be set optionally. For example, the diameter can be set to 0.5 nm to 50 nm.

A shape of the above-described columnar element can be set optionally. For example, the shape can include a substantially circular shape, an oval shape, and a polygonal shape.

The length of the above-described columnar element can be set optionally. The length can be set to preferably 0.01 μm to 100 μm, more preferably 0.01 μm to 10 μm, and most preferably 0.01 μm to 1 μm. If the length of the columnar element is shortened to 0.01 μm to 100 μm, rigidity between the cantilever and the cantilever attachment portion 2 is improved, and thus it is possible to improve performance of the scanning probe microscope. However, when a short and uniform columnar element is manufactured, in some cases, yield becomes poor. Therefore, the length of the columnar element is appropriately selected so that the performance and the cost are compatible with each other.

For example, according to the shape of the above-described columnar element, 20 or more columnar elements can be measured by using a scanning electron microscope (SEM) or a transmission electron microscope (TEM).

The nanofibers include carbon nanofibers, cellulose nanofibers, and cyclodextrin nanofibers. It is particularly preferable to use the carbon nanofibers.

The nanotubes include carbon nanotubes, nickel nanotubes, inorganic metal nanotubes, and organic polymer-based nanotubes. It is particularly preferable to use the carbon nanotubes.

A specific example of the inorganic metal nanotubes includes titania nanotubes, oxide nanotubes, molybdenum oxide nanotubes, cerium phosphate nanotubes, rare-earth oxide nanotubes, manganese oxide nanotubes, silicon oxide nanotubes, tantalum oxide nanotubes, vanadium oxide nanotubes, niobium oxide nanotubes, silicate nanotubes, imogolite nanotubes, boron nitride nanotubes, chalcogenide nanotubes, self-organization graphite nanotubes, and noble metal nanotubes.

A specific example of the organic polymer-based nanotubes includes lipid nanotubes and protein nanotubes.

For example, in order to ensure adhesion performance between the columnar elements and the cantilever attachment portion 2, it is preferable to configure the lower surface 2a of the cantilever attachment portion 2 to include single crystal silicon, silicon nitride, silicon oxide, various metals (Au, Pt, Ni, brass, and stainless steel), glass, a transparent conductive film of indium tin oxide (ITO), and the like.

Then, for example, the nanofibers or the nanotubes are formed to grow on the lower surface 2a by using a chemical vapor deposition method (CVD method), thereby enabling the above-described columnar elements to be formed.

For example, when the carbon nanofibers or the carbon nanotubes are formed to grow, it is possible to employ the chemical vapor deposition method (CVD method) which introduces a carbon source at a temperature of approximately 400° C. to 800° C.

The cantilever 1 is generally manufactured so as to include a silicon substrate by using a micro-electromechanical system (MEMS).

As described above, in the present embodiment, it is unnecessary to provide a complicated mechanism such as a vacuum suction mechanism when the cantilever 1 is fixed to the cantilever attachment portion 2. It is possible to realize miniaturization, weight reduction, and cost reduction of the overall scanning probe microscope. In addition, the cantilever attachment portion does not become heavier, and a response to movement of the cantilever attachment portion is improved. In addition, unlike a case where the cantilever is fixed to the cantilever attachment portion by using a magnet, it is possible to avoid magnetic influence during measurement.

Next, a configuration of the cantilever supply mechanism 20 will be described. As illustrated in FIG. 2, the cantilever supply mechanism 20 holds multiple cantilevers 1 for replacement, and has an installation surface 20a for installing the cantilever 1 and wall portions 20b and 20c protruding from the installation surface 20a.

Here, the lower surface 2a of the cantilever attachment portion 2 is tilted. The installation surface 20a is also tilted toward the front surface so that the tilted surface of the lower surface 2a and the upper surface 1a of the cantilever 1 are substantially parallel to each other.

The front surface side of the installation surface 20a is open. The vertical surfaces on two side surfaces of the installation surface 20a form the wall portion 20b, and the vertical surfaces on the rear surface of the installation surface 20a form the wall portion 20c. A projection (not illustrated) is appropriately disposed so that the cantilever 1 is dropped down from the opening on the front surface side of the installation surface 20a.

In the present embodiment, an elastic body (not illustrated) is arranged on the installation surface 20a. When the cantilever 1 is attached to the lower surface 2a of the cantilever attachment portion 2, even if an error occurs in an attachment angle between the upper surface 1a and the lower surface 2a or a difference occurs in an optimum pressing distance during the attachment due to variations in the thickness of the cantilever attachment portion, it is possible to absorb the variations by pressing harder. As the elastic body, a rubber sheet, a gel sheet, or a plate having a spring mechanism may be employed.

Then, if the XY-stage 10 and the Z-stage 9 are operated so as to lower the cantilever attachment portion 2 in the Z-direction and the cantilever attachment portion 2 is brought into contact with the upper surface 1a of the cantilever 1 held by the cantilever supply mechanism 20, the columnar elements on the lower surface 2a are fixed by adhering the upper surface 1a. Finally, cantilever attachment work is completed by raising the Z-stage 9.

The cantilever attachment portion 2 is not usually replaced, and the cantilever 1 is replaced as a consumable item. From the viewpoint that a commercially available cantilever can be used, it is preferable to form the columnar elements in the cantilever attachment portion 2. However, as will be described later, the columnar elements may be formed on the cantilever 1 side.

If the cantilever attachment portion 2 is allowed to have conductivity and conductive materials (for example, carbon nanofibers or carbon nanotubes) are used for the columnar elements, it is possible to apply an electrical signal to the cantilever 1.

Next, referring to FIGS. 3A and 3B, a method of detaching the cantilever 1 from the cantilever attachment portion 2 will be described.

As described above, the columnar elements extend from the lower surface 2a of the cantilever attachment portion 2 in a substantially vertical direction. Therefore, if force is applied to a portion between the cantilever 1 and the cantilever attachment portion 2 in the horizontal direction (direction parallel to the adhesion surface), the adhesion force of the columnar elements is weakened rapidly. Accordingly, it is possible to detach the cantilever 1 from the cantilever attachment portion 2.

Figure 3A:
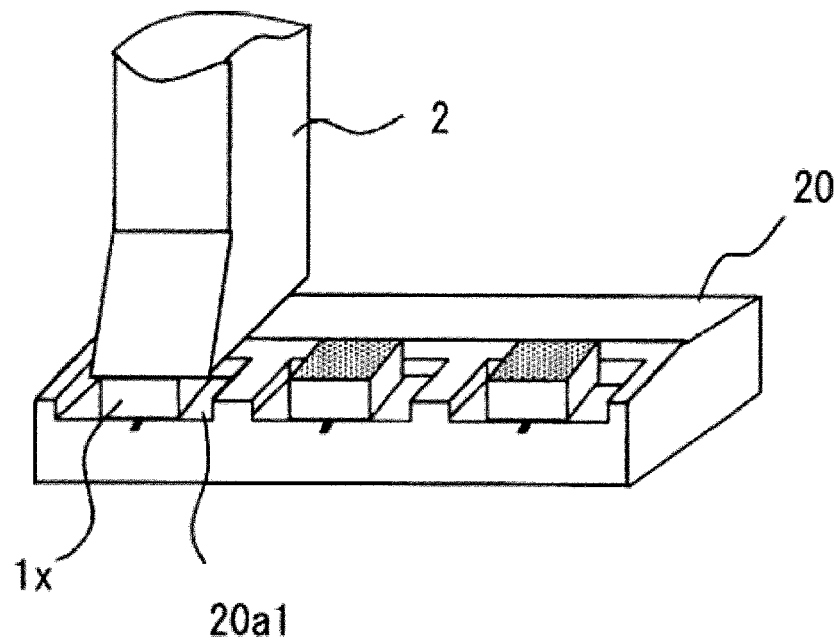
FIGS. 3A and 3B are views illustrating a method of detaching a cantilever from a cantilever attachment portion.
Figure 3B:
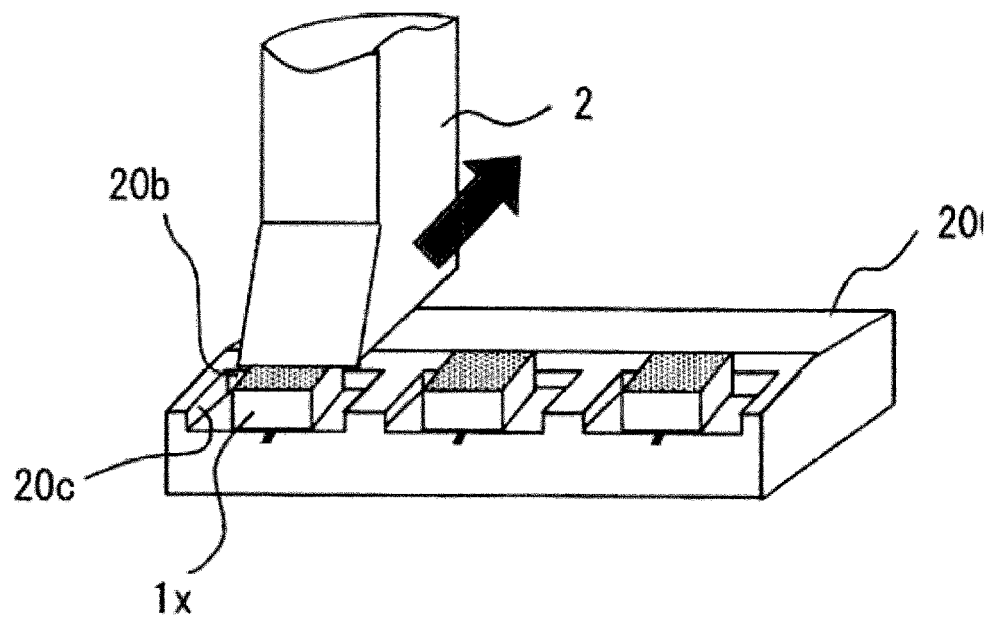

Therefore, as illustrated in FIG. 3A, the XY-stage 10 and the Z-stage 9 are first operated, and a cantilever 1x after use which is attached to the cantilever attachment portion 2 is installed on an installation surface 20a1 which is unoccupied in the cantilever supply mechanism 20. Then, as illustrated in FIG. 3B, if the XY-stage 10 and the Z-stage 9 are operated in this state so as to move the cantilever attachment portion 2 rearward (refer to an arrow in FIG. 3B), the cantilever 1x comes into contact with the wall portion 20b, and the cantilever 1x is accommodated on the installation surface 20a1 by being detached therefrom. In this manner, it is unnecessary to dispose a complicated mechanism for detaching the cantilever in the cantilever supply mechanism, thereby enabling the wall portion 20b to easily detach the cantilever. The detached cantilever can be held by the cantilever supply mechanism without any change.

The cantilever may be detached by using the wall portion 20c.

The present invention is not limited to the above-described embodiment.

For example, in the above-described embodiment, the columnar elements are formed on the lower surface (second attachment surface) 2a of the cantilever attachment portion 2. However, without being limited thereto, the columnar elements may be formed on the upper surface (first attachment surface) 1a of the cantilever 1.

Here, as described above, the cantilever 1 is generally manufactured so as to include a silicon substrate by using a micro-electromechanical system (MEMS). Therefore, for example, the nanofibers or the nanotubes are formed to grow on the upper surface 1a of the cantilever 1 by using a chemical vapor deposition method (CVD method), thereby enabling the above-described columnar elements to be formed.

The columnar elements may be formed on both the first attachment surface and the second attachment surface. In this case, a suction force generated by the columnar elements increases, and it is easy to maintain a suction state when each attachment surface is dirty.

For example, the above-described embodiment employs the scanning probe microscope using a lever scanning method in which the fine adjustment mechanism causes the cantilever attachment portion to scan the sample 8. However, as a matter of course, the present invention can be applied to a scanning probe microscope using a sample scanning method in which the cantilever attachment portion is fixed and the fine adjustment mechanism causes the XY-stage 10 to scan the sample 8.

What is claimed is:

1. A scanning probe microscope comprising:
    a cantilever including a lever having a tip at a first end of the lever and a support (chip) supporting a second end of the lever, the support including a first surface by which the lever is supported and a second surface including a first attachment surface, the second surface opposite to the first surface;
    a cantilever attachment portion including a second attachment surface to which the first attachment surface of the cantilever is attached; and
    columnar elements including one of a nanofiber and a nanotube, the columnar elements on at least one of the first attachment surface and the second attachment surface,
    wherein the columnar elements extend from at least one of the first attachment surface and the second attachment surface in a direction perpendicular to the corresponding at least one first attachment surface and second attachment surface and adhere the second attachment surface to the first attachment surface by an adhesion force, and are configured to detach by a force applied in a direction parallel to the at least one first attachment surface and second attachment surface that weakens the adhesion force.

2. The scanning probe microscope according to claim 1, wherein the columnar elements are on the second attachment surface and not on the first attachment surface.

3. The scanning probe microscope according to claim 1, wherein the columnar elements are on the first attachment surface and not on the second attachment surface.

4. The scanning probe microscope according to claim 1, wherein the columnar elements are on both the first attachment surface and the second attachment surface.

5. The scanning probe microscope according to claim 1, further comprising:
    a cantilever supply mechanism configured to hold the cantilever for replacement,
    wherein the cantilever supply mechanism includes an installation surface configured to install the cantilever and a wall portion protruding from the installation surface, and
    wherein the cantilever attached to the cantilever attachment portion is detached from the cantilever attachment portion after use by moving the cantilever attachment portion in such a manner that the cantilever comes into contact with the wall portion after the cantilever is disposed on the installation surface.

6. The scanning probe microscope according to claim 5, wherein the installation surface includes an elastic body.

7. The scanning probe microscope according to claim 1, wherein a length of the columnar element is 0.01 μm to 100 μm.

8. The scanning probe microscope according to claim 1, wherein the columnar element includes at least one element selected from a group consisting of carbon nanofibers, cellulose nanofibers, cyclodextrin nanofibers, carbon nanotubes, nickel nanotubes, inorganic metal nanotubes, and organic polymer-based nanotubes, the inorganic metal nanotubes includes titania nanotubes, oxide nanotubes, molybdenum oxide nanotubes, cerium phosphate nanotubes, rare-earth oxide nanotubes, manganese oxide nanotubes, silicon oxide nanotubes, tantalum oxide nanotubes, vanadium oxide nanotubes, niobium oxide nanotubes, silicate nanotubes, imogolite nanotubes, boron nitride nanotubes, chalcogenide nanotubes, self-organization graphite nanotubes, noble metal nanotubes, lipid nanotubes and protein nanotubes.

9. The scanning probe microscope according to claim 1, wherein at least one of the first attachment surface and the second attachment surface includes at least one material selected from a group consisting of single crystal silicon, silicon nitride, silicon oxide, Au, Pt, Ni, brass, stainless steel, glass, and a transparent conductive film of indium tin oxide.

* * * * *